July 5, 1966 A. C. SCHEITHAUER ETAL 3,258,999
BACKLASH ADAPTER
Filed Jan. 19, 1965
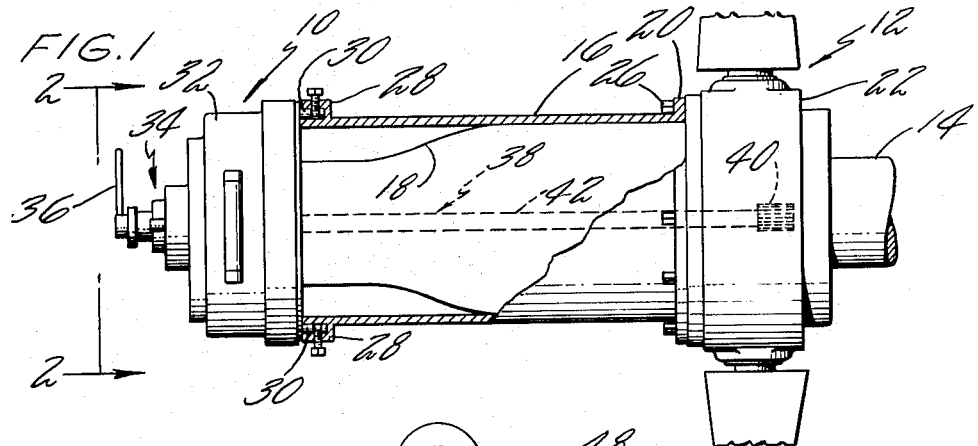
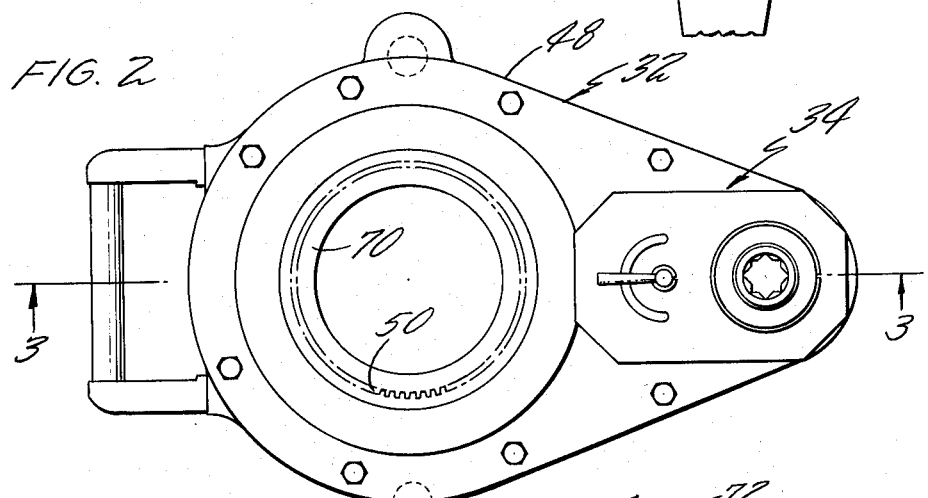
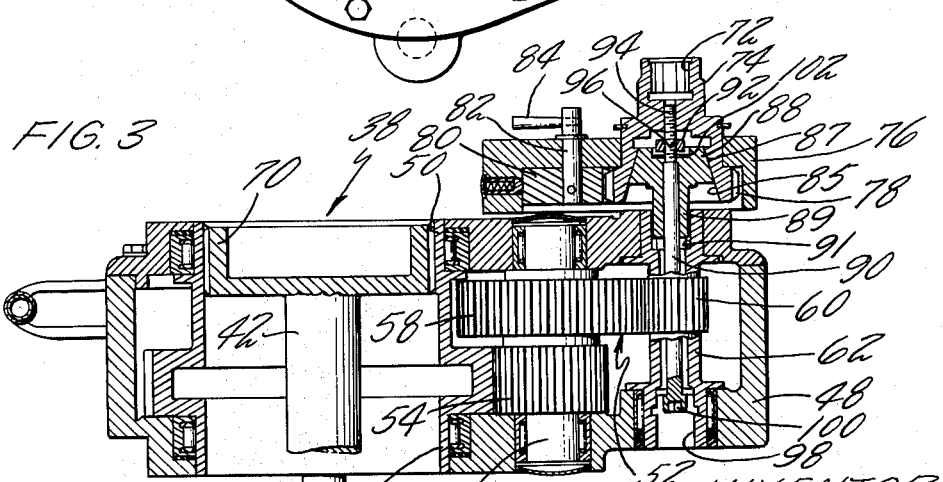
INVENTORS
ARTHUR C. SCHEITHAUER
EDWARD R. SIMMONS
BY Norman Friedland
ATTORNEY

United States Patent Office

3,258,999
Patented July 5, 1966

3,258,999
BACKLASH ADAPTER
Arthur C. Scheithauer, Canton, and Edward R. Simmons, Simsbury, Conn., assignors to United Aircraft Corporation, East Hartford, Conn., a corporation of Delaware
Filed Jan. 19, 1965, Ser. No. 426,619
4 Claims. (Cl. 81—57)

This invention relates to a tool for tightening or loosening a nut or bolt or the like, and particularly to means for eliminating torsional unwinding force evidenced when torquing down a nut or bolt particularly at high force levels.

In the heretofore known types of torquing assemblies a power wrench is utilized to couple the aircraft propeller to the engine shaft, which power wrench has an 11 to 1 reduction gearing. The shaft of the socket wrench driven by this gearing transmits the torque from the operator to the propeller retaining nut which secures the propeller to the engine shaft and has a tendency of twisting about its axis to about 45–60° when applying a 2200 ft. lb. torque load. When the operator attempted to remove the torque wrench, the load stored up in the shaft by virtue of the twisting was sufficient to cause him serious injury as well as being a source for damaging the torquing equipment.

We have found that we can obviate this problem by releasing the torsional unwinding in such a manner without it being transmitted to the hands of the operator and hence, eliminate the safety hazard.

It is therefore an object of this invention to provide means to prevent the torsional unwinding twist evidenced in a torquing operating from being transmitted to the operator.

A still further object of this invention is to provide a frictional drive mounted between the torque input and torque output of a torquing assembly which is adapted to be placed in engagement and disengagement operation.

Other features and advantages will be apparent from the specification and claims and from the accompanying drawings which illustrate an embodiment of the invention.

FIGURE 1 is a side elevation partly in section showing the power wrench mounted on a propeller for securing or removing the propeller to and from the engine shaft.

FIGURE 2 is a view taken along lines 2—2 of FIG. 1, and

FIGURE 3 is a sectional view taken along lines 3—3 of FIG. 2.

Now referring to FIGURE 1 which illustrates the torquing assembly generally illustrated by numeral 10, attached to an aircraft propeller generally indicated by numeral 12, mounted on engine shaft indicated by numeral 14. A cylindrical sleeve 16 slides over dome 18 of the propeller and has on its aft end an outwardly extending flange 20 containing a plurality of circumferentially mounted openings adapted to receive studs extending from hub 22 of propeller 12. A plurality of nuts 26 secure the cylindrical sleeve 16 to the hub. The forward end of cylinder 16 carries a pair of radially extending bosses 28 which contain a bore for receiving a pair of axially projecting studs 30 carried on power wrench generally indicated by numeral 32. The torque input and backlash adapter is suitably mounted on the front end of power wrench 32 and is generally indicated by numeral 34 and is adapted to receive torque wrench 36 that fits into a recess formed on the forward end thereof. To couple the propeller to the engine shaft the operator torques down the propeller retaining nut (not shown) which is carried in the propeller hub by rotating the torque wrench 36 which, in turn, drives reduction gearing in power wrench 32 for amplifying the torque which, in turn, drives the socket wrench 38 which carries at its most forward end spline 40, which, in turn, engages a complementary spline in the propeller retaining nut.

From the foregoing it is apparent that by rotation of the tool by the operator, the force or torque amplified by the power wrench 32 is transmitted to the retaining nut of the propeller by the socket wrench 38. In this manner the propeller is secured to or loosened from the engine shaft 14. In usual practice, the operator applies 200 ft. lbs. at the input, which is amplified by the power wrench to 2200 ft.-lbs. It can be seen that by virtue of the high level of torsional load the shaft 42 of the socket wrench 38 twists about its axis, say from 45–60°. This may be viewed as stored energy in the same manner that energy is stored in a torsional spring. A ratchet assembly in unit 34 prevents shaft 42 from unwinding while the operator is torquing down the retaining nut. The problem heretofore evidenced was when the ratchet was placed in the disengagement position, the shaft 42 containing the stored energy, noted above, would unwind with a terrific force tending to pull the torque wrench from the operator's hands which could result in serious injury to the operator.

Now referring to FIGURES 2 and 3 which show power wrench 32 with the torque input and backlash adapter 34 mounted thereon. The power wrench comprises a suitable housing 48 which rotatably supports ring gear 50. Ring gear 50 is driven by reduction gear train generally indicated by numeral 52, which comprises spur gear 54 fixed to rotatable shaft 56 and spur gear 58 spaced therefrom and also fixed to rotatable shaft 56. Spur gear 58, in turn, meshes with pinion gear 60 which is integrally mounted on shaft 62 rotatatably mounted in housing 48. Gear 54, in turn, meshes with the external teeth on ring gear shaft 64 which is rotatably mounted in housing 48. Thus from the foregoing it is apparent that rotation of shaft 62 causes rotation of pinion gear 60 which, in turn, drives spur gear 58 and hence, shaft 56 for driving spur gear 54 which, in turn, drives ring gear shaft 64 for driving internal ring gear 50. Socket wrench 38 which comprises spur gear 70 suitably attached to one end of shaft 42 meshes with the internal ring gear 50 for transmitting the torque from shaft 62 to the reduction gearing generally indicated by 52 to the propeller retaining nut via shaft 42.

Tool 36 carries a suitable tool engagement projection which is inserted into a complementary opening 72 formed on the top end of ratchet member 74 of input and backlash adapter 34. Ratchet member 74, rotatably secured in ratchet housing 76, carries on its outer diameter ratchet teeth 78 which mesh with the teeth of the ratchet cam member 80, which cam member is suitably fixed to the upwardly extending shaft 82. Pin 84, secured to the end of shaft 82 projecting through a slot in the housing, serves to rotate cam 80 to place it in neutral, righthand rotation and lefthand rotation positions. It is to be understood that the ratcheting arrangement is of any suitable type and is shown in this fashion merely for illustrative purposes. A conically shaped bore 85 is formed on the internal diameter of ratchet driving member 74 which surface complements the external conically-shaped surface 87 of friction driven member 88. Friction driven member 88 carries a downward projection 89 integrally formed thereon which fits into recess 91 in driving engagement. Recess 91 may take the same shape as opening 72 so that tool 36 will fit therein to drive the power wrench with the adapter removed.

Centrally disposed through an internal elongated bore in shaft 62 is partially threaded rod 90. Nut 92 is threaded on the threaded portion 94 of rod 90 and is suitably fixed thereto by pin 96.

As viewed from the drawing, on the bottom of housing 48, bore 98 is provided for receiving a tool which fits into recess 100 formed on the bottom face of rod 90. The threaded portion 94 of rod 90 engages internal complementary threads in the input ratchet member 74 so that when it is rotated, the nut 92 is moved away from washer 102 which bears against the top face of the conically-shaped member 88, allowing the conical face 85 of input ratchet member 74 to come into frictional engagement with the conical face 87. Further rotation of 74 rotates shaft 62 which, in turn, rotates pinion gear 60 and causing the internal ring gear 50 to rotate in the manner described above.

When the proper torque has been obtained, the operator then inserts a complementary tool through bore 98 into tool receiving recess 100 of rod 90 and rotates it in a counter-rotational direction to drive nut 92 in a downward direction. This, in turn, causes nut 92 to bear against washer 102 which forces the conically-shaped friction driven member 88 away from surface 85 and in out-of-engagement position with input ratchet member 74, thus allowing the torsional unwinding force noted in shaft 42 to unwind through the reduction gearing 52. It will be noted that there is a space between the bottom end of abutment 89 and the bottom of recess 91 to allow axial downward movement of member 88 when it is moved to the disengaged position.

From the foregoing, it will be apparent that the unwinding load stored up in the socket wrench 38 is transmitted through the power wrench, allowing shaft 62 to rotate, and since this shaft is decoupled from the ratchet input shaft 74, the force is therefore prevented from reaching the torque wrench used by the operator and hence, eliminating the safety hazard.

It should be understood that the invention is not limited to the particular embodiments shown and described herein, but that various changes and modifications may be made without departing from the spirit or scope of this novel concept as defined by the following claims.

We claim:
1. For a wrench adapted to tighten or loosen a nut or bolt or the like of the type having a gear train, mechanism having an elongated shaft carrying means for connecting with the nut or the like intended to be tightened or loosened, and being driven by the gear train, and mechanical driving means including a gear connected to the gear train for imposing torque to the element intended to be tightened, the improvement comprising means for eliminating backlash attendant the rotation of the elongated shaft, said means including a housing, a rotatable member rotatably supported in said housing, ratchet mechanism connected to said rotatable member and adapted to allow the rotatable member to rotate in one direction, said rotatable member having a driving surface, a rotatable driven member engageable with said rotatable member and adapted to drive the same, said rotatable driven member having a driven surface frictionally engageable with said driving surface, and means to disengage said surface so as to allow said rotatable driven member to rotate independently of said rotatable member.

2. For a wrench adapted to tighten or loosen a nut or bolt or the like of the type having a gear train, mechanism having an elongated shaft and carrying means for connecting the nut or the like intended to be tightened or loosened, and being driven by the gear train, and mechanical driving means including a gear connected to the gear train for imposing torque to the element intended to be tightened in the gear train, the improvement comprising means for eliminating backlash attendant the rotation of the elongated shaft, said means including a housing, a rotatable member rotatably supported in said housing, ratchet mechanism connected to said rotatable member and adapted to allow the rotatable member to rotate in one direction, a rotatable driven member, said rotatable driven member having a conically-shaped surface frictionally engageable with the wall surface of a conically-shaped bore centrally disposed in said driving rotatable member, and means to disengage said surface so as to allow said rotatable driven member to rotate independently of said rotatable member.

3. For a wrench adapted to tighten or loosen a nut or bolt or the like of the type having a gear train, mechanism having an elongated shaft carrying means for connecting the nut or the like intended to be tightened or loosened, and being driven by the gear train, and a hollow shaft having an external gear fixed thereto and drivingly connected to the gear train for imposing torque to the element intended to be tightened in the gear train, the improvement comprising means for eliminating backlash attendant the rotation of the elongated shaft, said means including a housing, a rotatable member rotatably supported in said housing and disposed adjacent one end of said shaft, ratchet mechanism connected to said rotatable member and adapted to allow the rotatable member to rotate in one direction, said rotatable member having a driving surface, a rotatable driven member having a projection adapted to fit into a recess formed in said one end of said hollow shaft and in driving relation therewith, an elongated rod extending through said hollow shaft and a central bore formed in said rotatable driven member, means carried by said rod for placing said rotatable driven member in friction engagement with said driving surface, and tool receiving means accessible through the other end of said hollow shaft to disengage most of said surface so as to allow said rotatable driven member to rotate independently of said rotatable member.

4. For a wrench as claimed in claim 3 wherein said elongated rod has a threaded end portion, a radially extending member fixed on said threaded end portion and adapted to bear against a top surface of sai rotatable driven member to disengage it from said rotatable driving member.

References Cited by the Examiner
UNITED STATES PATENTS 2,863,347   12/1958   Nelson _____ 81—57 X
3,133,462   5/1964    Whipp _____ 81—57

WILLIAM FELDMAN, *Primary Examiner.*

J. L. JONES, JR., *Assistant Examiner.*